US012743691B2

(12) United States Patent
Biggs et al.

(10) Patent No.: US 12,743,691 B2
(45) **Date of Patent: *Sep. 22, 2026**

(54) DIGITAL ASSET VAULT

(71) Applicant: Wells Fargo Bank, N.A., San Francisco, CA (US)

(72) Inventors: Todd Steven Biggs, Littleton, CO (US); Phillip H. Griffin, Raleigh, NC (US); Upul D. Hanwella, San Francisco, CA (US); Mabel Oza, Skokie, IL (US); Luiz Silva, Pleasant Hill, CA (US); Jeff J. Stapleton, O'Fallon, MO (US); Richard Stec, Minneapolis, MN (US); Kurt Paul Stevens, Lewisville, NC (US); Luis A. Suarez, Bolivia, NC (US); Sean Xiang Zhang, Walnut Creek, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/308,817

(22) Filed: Aug. 25, 2025

(65) Prior Publication Data

US 2025/0390862 A1 Dec. 25, 2025

Related U.S. Application Data

(63) Continuation of application No. 18/735,541, filed on Jun. 6, 2024, now Pat. No. 12,423,679, which is a (Continued)

(51) Int. Cl.

*G06Q 20/36* (2012.01)
*G06F 16/28* (2019.01)
(Continued)

(52) U.S. Cl.

CPC ....... *G06Q 20/3674* (2013.01); *G06F 16/285* (2019.01); *G06Q 20/3829* (2013.01); (Continued)

(58) Field of Classification Search

CPC ........... G06Q 20/3674; G06Q 20/3829; G06Q 40/02; G06Q 40/04; G06Q 50/186; G06F 16/285; H04L 9/0861; H04L 9/3213
See application file for complete search history.

(56) References Cited

U.S. PATENT DOCUMENTS 6,598,161 B1 * 7/2003 Kluttz ................ G06F 21/6209 713/168
7,155,739 B2 12/2006 Bari et al.
(Continued)

FOREIGN PATENT DOCUMENTS

FR 2995708 A1 3/2014
WO 2020110079 A1 6/2020

OTHER PUBLICATIONS

Hossein Rezaeighaleh, et al., New Secure Approach to Backup Cryptocurrency Wallets, Feb. 27, 2020, IEEE, pp. 1-6 (Year: 2020).*
(Continued)

*Primary Examiner* — Nilesh B Khatri
(74) *Attorney, Agent, or Firm* — Merchant & Gould P.C.

(57) ABSTRACT

Securing digital assets in a vault that interfaces with multiple different third-party wallets to store keys/mnemonics. The vault interface accepts input from multiple different party wallets to combine multiple encryptions and secure storage techniques. Numerous cryptographic mechanisms are employed to securely pull a mnemonic phrase from a third-party wallet and into an institution's vault. A customer's mnemonic phrase is securely transported from a per-
(Continued)

sonal wallet into a secured institution's encrypted vault using the power of HSM to encrypt and decrypt a customer's mnemonic phrase securely.

20 Claims, 8 Drawing Sheets

Related U.S. Application Data continuation of application No. 17/370,545, filed on Jul. 8, 2021, now Pat. No. 12,073,386.

(51) Int. Cl.

| | |
|---|---|
| ***G06Q 20/38*** | (2012.01) |
| ***H04L 9/08*** | (2006.01) |
| ***H04L 9/32*** | (2006.01) |
| *G06Q 40/02* | (2023.01) |
| *G06Q 40/04* | (2012.01) |
| *G06Q 50/18* | (2012.01) |

(52) U.S. Cl.

CPC .......... *H04L 9/0861* (2013.01); *H04L 9/3213* (2013.01); *G06Q 40/02* (2013.01); *G06Q 40/04* (2013.01); *G06Q 50/186* (2013.01)

(56) References Cited

U.S. PATENT DOCUMENTS

| | | | | |
|---|---|---|---|---|
| 8,327,450 | B2 | 12/2012 | Clement et al. | |
| 8,675,875 | B2 | 3/2014 | Yellepeddy et al. | |
| 9,077,538 | B1 * | 7/2015 | Cooley | H04L 63/0884 |
| 9,996,835 | B2 | 6/2018 | Dill et al. | |
| 10,447,475 | B1 | 10/2019 | Lindell | |
| 10,460,313 | B1 * | 10/2019 | Clark | H04L 63/0815 |
| 10,693,658 | B2 | 6/2020 | Jacobs et al. | |
| 10,861,090 | B2 | 12/2020 | Haggerty et al. | |
| 10,929,843 | B2 | 2/2021 | Khan | |
| 11,095,458 | B2 | 8/2021 | Dasen et al. | |
| 11,455,694 | B2 | 9/2022 | DiNunzio et al. | |
| 11,483,147 | B2 | 10/2022 | Kurian et al. | |
| 11,562,242 | B2 | 1/2023 | Katz et al. | |
| 11,727,504 | B2 | 8/2023 | Cella | |
| 11,849,032 | B2 | 12/2023 | Stokes et al. | |
| 11,899,812 | B2 | 2/2024 | Donohoe | |
| 11,902,442 | B2 | 2/2024 | Rule et al. | |
| 2001/0008012 | A1 * | 7/2001 | Kausik | H04L 9/3268 380/282 |
| 2008/0235780 | A1 * | 9/2008 | Olive | G06F 21/6272 726/5 |
| 2008/0263629 | A1 * | 10/2008 | Anderson | H04L 9/3213 726/2 |
| 2009/0025090 | A1 * | 1/2009 | Clement | G07C 9/27 726/28 |
| 2011/0295707 | A1 * | 12/2011 | Gui | G06Q 20/206 705/64 |
| 2014/0324690 | A1 | 10/2014 | Allen et al. | |
| 2015/0379295 | A1 * | 12/2015 | Branton | G06F 21/6218 713/165 |
| 2016/0028698 | A1 * | 1/2016 | Antipa | G06F 21/606 713/150 |
| 2017/0011213 | A1 * | 1/2017 | Cavanagh | H04L 67/02 |
| 2018/0144341 | A1 * | 5/2018 | Kärkkäinen | G06Q 20/02 |
| 2019/0245682 | A1 * | 8/2019 | Alwen | H04L 9/3247 |
| 2019/0266576 | A1 | 8/2019 | McCauley et al. | |
| 2019/0280866 | A1 * | 9/2019 | Zhuang | H04L 9/006 |
| 2019/0362340 | A1 | 11/2019 | Strong et al. | |
| 2019/0385164 | A1 * | 12/2019 | Royyuru | H04L 9/3213 |
| 2021/0051003 | A1 * | 2/2021 | Jarjoui | G06Q 20/3825 |
| 2021/0357915 | A1 * | 11/2021 | Makrides | G06Q 20/384 |
| 2023/0005391 | A1 * | 1/2023 | Sharma | G06F 21/62 |

OTHER PUBLICATIONS

R. Dheekksha, et al., Design and Development of a Secure Password Vault Using RSA Parallelization, Jun. 21, 2021, IEEE, pp. 537-544 (Year: 2021).*

"IEEE Standard for Custodian Framework of Cryptocurrency," IEEE Std 2140.5-2020, pp. 1-23, Published Jul. 17, 2020, https://standards.ieee.org/ standard/2140_5-2020.html th.

Aditya Kamat, et al., "Performance Analysis and Survey on Security of Password Managers and Various Schemes of P2P Models," Feb. 27, 2020, IEEE, pp. 23-26 (Year: 2020).

Hannes Salin, et al., "Mission Impossible: Securing Master Keys," Jun. 29, 2021, Arxiv (Year: 2021).

Lindell et al. "Fast Secure Multiparty ECDSA with Practical Distributed Key Generation and Applications to Cryptocurrency Custody" Bar-Ilan University, CCS'18, Toronto, ON, Canada; date of publication: Oct. 15-19, 2018, hllps://dl.acm.org/doi/pdf/10.1145/3243734.3243788 ( pp. 1837-1854, 28 ppgs.).

Weinstock et al. "OCC Opens the Door for Banks to Offer Cryptocurrency Services," date of publication: Jul. 31, 2020, 5 pages, https:/lwww.lexology.com/ library/detail.aspx?g=56433284-0c50-49ed-86a6-1ce4eda5ba60.

* cited by examiner

Figure 2

DIGITAL ASSET VAULT

BACKGROUND

More people are using online tools to store assets and conduct transactions. A pressing issue associated with these digital assets is security, including the "keys" used to protect and access the assets. Common ways to store the keys for these assets is in cold storage (e.g., a physical flash drive) or to physically write them down on piece of paper. If these records are stolen or lost, the user is vulnerable to potential theft or the inability to access the assets.

SUMMARY

Embodiments of the disclosure are directed to protecting digital assets by securely transporting and storing confidential information associated with those assets.

According to aspects of the present disclosure, a system comprises: one or more processors; and non-transitory computer-readable storage encoding instructions which, when executed by the one or more processors, causes the system to: receive a request to connect to a secure portal; generate a key; receive data associated with a categorization type from one or more data sources; prepare the data with category types, including to: encrypt the data at least twice; store the data based on one of the category types.

In another aspect, a computer-implemented method of securely transporting and storing data comprises: receiving a request to connect to a secure portal; generating a key; receiving data associated with a categorization type from one or more data sources; preparing the data with category types, including to: encrypt the data at least twice; storing the data based on one of the category types.

Yet another aspect is directed to a system for removing an asset from a digital asset vault. The system comprises: one or more processors; and non-transitory computer-readable storage encoding instructions which, when executed by the one or more processors, causes the system to: receive a request to connect to a secure portal; generate a key; receive data associated with a categorization type from one or more data sources; preparing the data with category types, including to: decrypt the data at least twice; storing the data based on one of the category types.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 shows example logical components of a server device of the system of FIG. 1.

DETAILED DESCRIPTION

Figure 1:
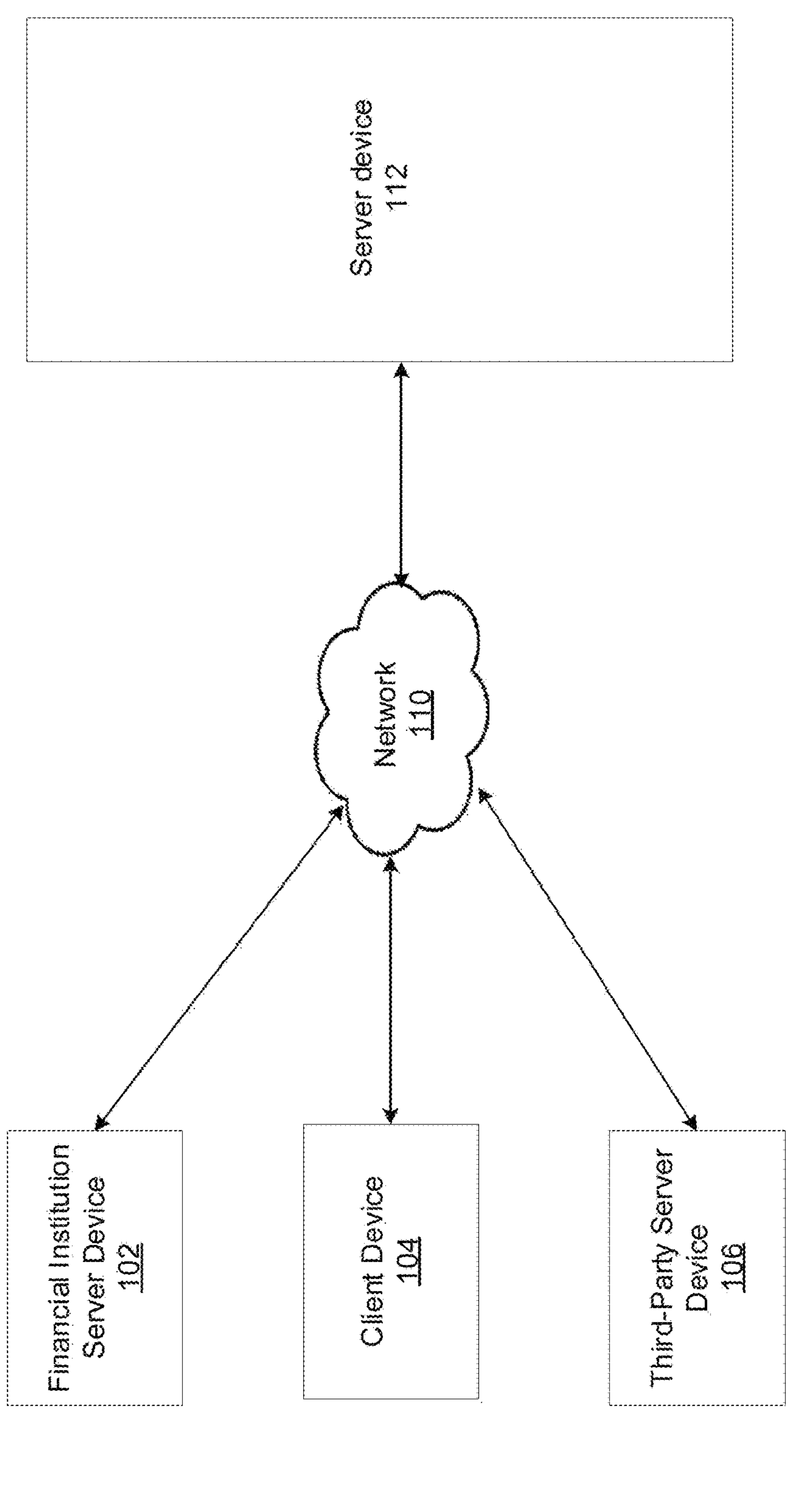
FIG. 1 shows an example system in which aspects of the present disclosure can be implemented.

This disclosure relates to a backup service for confidential information such as digital records and secrets. This can include to securely transport confidential information into a vault and securely store it.

The advantages of such a vault can include protection of a customer's financial health as they digitalize their assets and legal documents, to allow a customer to access and store securely digitally from various locations or third-parties, or assign a beneficiary assets in real-time to reduce manual and time inefficient processes. This technology can function to secure the customer's secret when a secret travels to the vault from a third party, where it is encrypted. Once within the vault, the secret is stored in a secure database.

The system provides secure backing up of any digital information that a customer deems confidential. A few non-limiting examples of the type of information stored in a vault include a crypto wallet mnemonic phrase, a social security number, passwords, a copy of a property deed document, a copy of a power of attorney document, and other legal documents, etc. From a customer's perspective, the system provides a method of backing up confidential information so that customers can securely store and access the information digitally from anywhere instead of having a physical source with limited, non-digital access.

Another non-limiting example may include a customer's desire to select particular beneficiaries to access the backup confidential information from a remote location. Another non-limiting example may include backing up all digital assets so an enterprise can confidently account for the security of all company assets. Another non-limiting example may consist of the desire to confidential company information in an accessible location for employees to access from any remote location.

Disclosed is a vault that allows an individual to store digital assets. A digital asset can be a crypto wallet mnemonic phrase, social security number, passwords, digital copies of a property deed document, digital copies of a power of attorney document, etc. A digital asset can be anything an individual can consider or deem confidential or a secret. For example, a digital asset can be a mnemonic that allows the user to secure and access digital currency.

More specifically, the present disclosure is directed to securing a customer's digital assets in a vault that interfaces with multiple different third-party wallets to store keys/mnemonics. For example, the present disclosure features a vault interface that accepts input from multiple different party wallets to combine multiple encryptions and secure storage techniques. Numerous cryptographic mechanisms are employed to securely pull a mnemonic phrase from a third-party wallet and into an institution's vault. A customer's mnemonic phrase is securely transported from a personal wallet into a secured institution's encrypted vault using the power of hardware secure modules ("HSM") to encrypt and decrypt a customer's mnemonic phrase securely. Further, as more and more customers are withdrawing funds from the financial institutions to acquire digital assets, the disclosed service assists in securing those assets. For example, users of cryptocurrency wallets may need to back up their wallets via the disclosed service to meet the growing demand to secure crypto assets.

FIG. 1 schematically shows aspects of an example system 100 of the present disclosure. The system 100 includes a financial institution server device 102, a client electronic device 104, a third-party server device 106, and a server device 112.

The financial institution server device 102 may be one or more computing devices associated with an organization that has security procedures in place to house a secure digital vault that can interact with third-party digital vaults. Examples of financial institutions that manage such a financial institution server device 102 include banks, brokerage firms, mortgage companies, or any other money-handling enterprise.

The client electronic device 104 may be a client that is interacting with a digital vault provided by the server device 112. An example client electronic device 104 can include a mobile computer, desktop computer, or other computing device used by a customer to manage digital assets.

The third-party server device 106 may be a third-party institution that is authorized to transport digital assets to and from the digital vault. Examples of third parties that may manage the third-party service device 106 includes financial institutions, exchanges such as cryptocurrency exchanges, etc. that allow customers to purchase and manage digital assets such as cryptocurrency.

Each device 102, 104, 106 can be associated with one of the parties involved in the secure transport and storage process, such as the customer, etc.

The server device 112 can be managed by, or otherwise associated with, an enterprise (e.g., a financial institution such as a bank, brokerage firm, mortgage company, or any other money-handling enterprise) that uses the system 100 for securely storing digital assets.

The devices 102, 104, 106 include input devices by which the server device 112 obtains data. The server device 112 can also obtain data via other input devices, which can correspond to any of the electronic data acquisition devices described above, such as links to third-party data stores (e.g., through an application programming interface-API), etc.

The server device 112 can be connected via a network 110 to the client devices 102, 104, 106 to transported digital assets securely there between. The server device 112 can use electronic biometric identity devices, such as the face, eye, and/or fingerprint scanners, to confirm a user's identity or another relevant party during one or more stages of securely transporting and storing digital assets.

Figure 2:
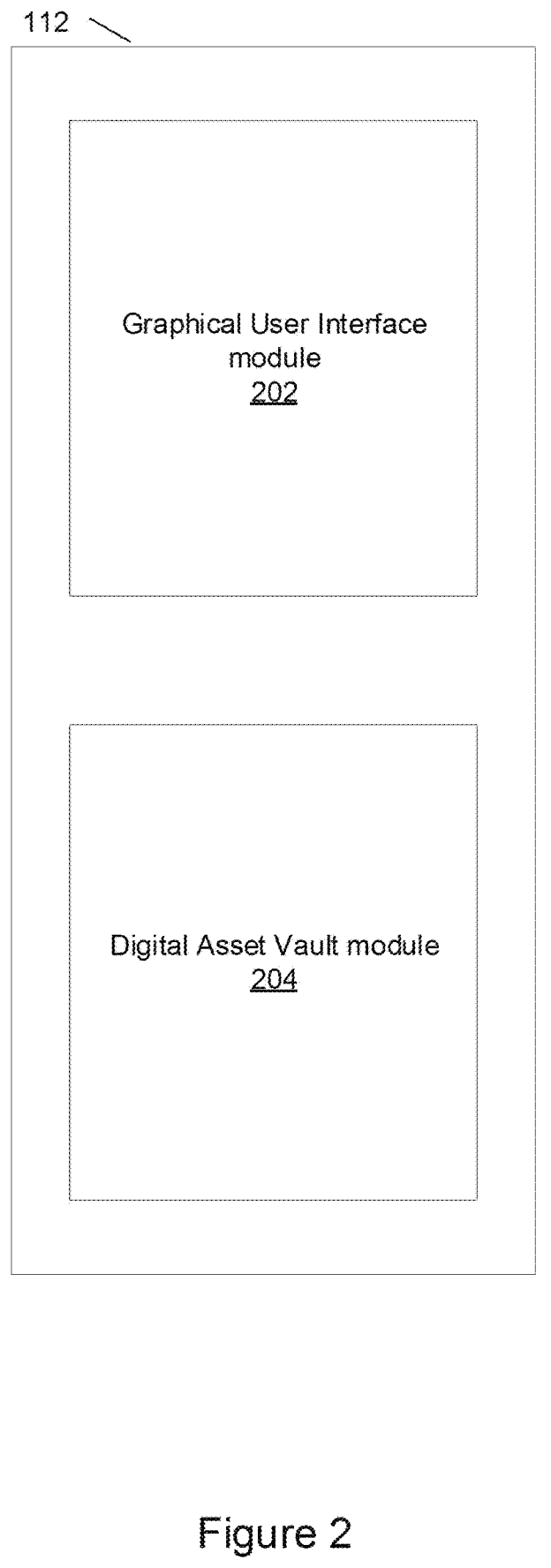

FIG. 2 schematically shows aspects of a server device 112 of the system 100. The server device 112 includes a graphical user interface module 202 and a digital asset vault module 204.

The graphical user interface module 202, rendered by the server device 112, provides an interface for displaying and navigating a digital asset vault module 204. In some examples, the graphical user interface module 202 can render interfaces that allow a customer to access the vault, store secrets associated with digital assets within the vault, and otherwise manipulate the vault, as describe further below. See, e.g., FIG. 5.

The digital asset vault module 204 is programmed to manage the transport and storage of a secret associated with a digital asset, such as a wallet mnemonic, a password, etc. Additional details of the digital asset vault module 204 are provided below.

Figure 3:
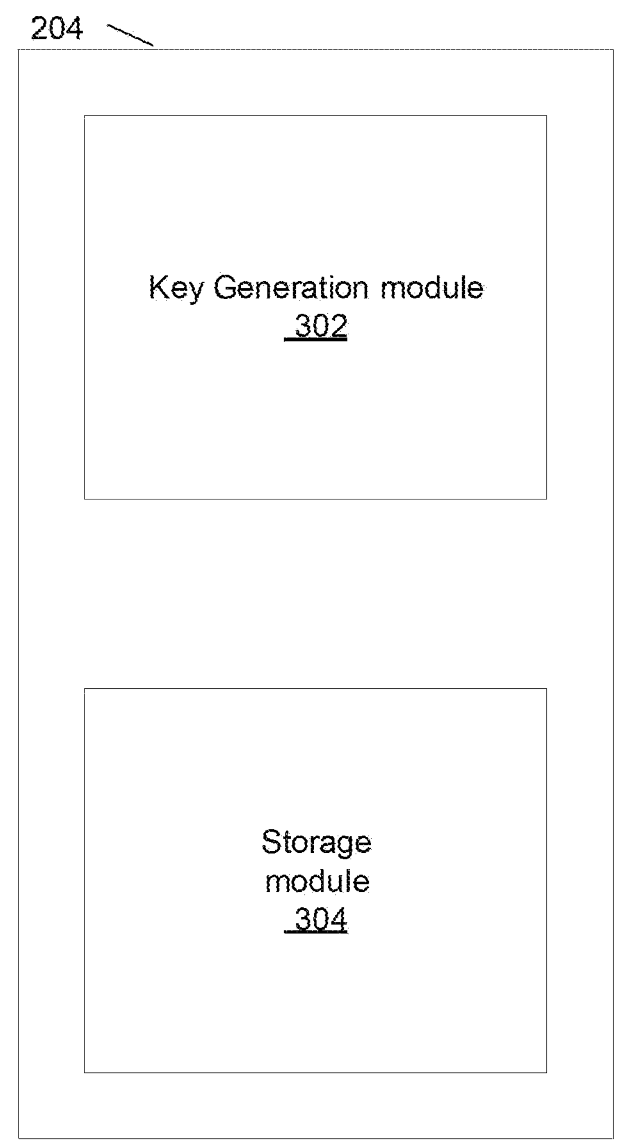
FIG. 3 shows an example digital asset vault of the server device of FIG. 2.

FIG. 3 schematically shows aspects of the digital asset vault module 204 of the server device 112. The digital asset vault module 204 includes a key generation module 302 and a storage module 304.

The key generation module 302 establishes encryption keys based on several different schemes, including but not limited to Elliptic Curve Diffie Hellman Ephemeral (ECDHE), RSA-OAEP, and Post-Quantum Cryptography ("PQC"). The key generation module 302 allows for communications to and from the digital asset vault module 204 to be protected through one or more layers of encryption.

For instance, the ECDHE approach would enable forward secrecy, where the encryption key must be ephemeral to prevent any person from reviewing when there is a compromise.

While the RSA-OAEP scheme may not provide forward secrecy, not having forward secrecy would still be satisfied because a one-way data exchange would occur. For example, in one session, the digital asset vault module 204 and the client device 102, 104, 106 would not be permitted to exchange back and forth with one another. In the circumstance of a man-in-the-middle ("MitM") attack, the worst occurrence is that the bad actor would send the digital asset vault module 204 the wrong secret, where the secret still would not be accepted because the bad actor would not have a trusted certificate.

In the Diffie Hellman symmetric key agreement, neither party is exchanging keys; instead, both parties create the key together. For example, all parties agree on using certain pieces of a puzzle and using those certain pieces and secrets only each party knows; each party needs to solve part of the puzzle. Once each party solves their piece, the party shares that solved piece to obtain the shared secret.

There are a few of varieties of Diffie Hellman, Static, Diffie Hellman Ephemeral (DHE), and ECDHE. A secure approach is to use ECDHE because it is based on DHE, and it achieves Perfect Forward Secrecy (PFS), so it uses a new key pair every time, curbing the privacy risk of past sessions. In addition, ECDHE uses ECC key pairs. The below image is an elliptic curve ($y^2=x^3-2x+2$); the public and private keys are derived from different points on the curve.

The specific ECDHE algorithm in the present disclosure for implementation would is the Double Ratchet algorithm. Double Ratchet is reasonably popular amongst popular messaging apps (e.g., WhatsApp, Signal, Line, Skype, etc.) that provide end-to-end encryption. A ratchet function can only move forward with Double Ratchet, which uses KDF ("Key Derivation Function").

Parties typically use a key agreement such as X3DH to come to an agreement on a shared key. Once the shared key is established, the parties would use Double Ratchet to send and receive messages. In the present disclosure, secret phrases are used when users are storing and retrieving. Each time a message is exchanged, new key pairs are generated, and Diffie Hellman calculations along with the new keys are attached to the message, ensuring "future secrecy." If a compromise were to occur, then it is able to self-heal and protect future messages. There is one chain for sending messages, a second for receiving messages, and a third for Diffie Hellman. Between the client and server parties, the sending chain is able to match up with the receiving chain of the other party.

In another scenario, RSA-OAEP & AES-256 can be implemented for encryption. If a party is decrypting the information, then that party sends the public key to other parties to encrypt the data. RSA-OAEP is a combination of the RSA algorithm and the Optimal Asymmetric Encryption Padding ("OAEP") method. AES GCM-256 is a block cipher that encrypts and decrypts data in blocks of 128 bits using a cryptographic 256-bit key.

RSA is an asymmetric encryption algorithm based on public and private keys. It comes from the difficulty of factoring two large prime numbers. The secret encrypted with the public key can be decrypted with the private key. OAEP is a method to pad the message with enough randomness, preventing the Bleichenbacher attack. The message is initially padded with 000's and a random digit.

Encryption occurs twice because RSA unaided would not provide the security necessary for the required level of security. The limitations of using RSA alone are apparent when lengthy messages are used, so AES comes in helpful. RSA is used chiefly to encrypt the keys, and algorithms like AES are the ones that can encrypt and decrypt large messages. Integrity is ensured this way because RSA-OAEP has a built-in checksum, which detects incorrect decrypting attempts.

Yet another scenario involves PQC. At the same time, the strength of RSA and Diffie Hellman lies in the difficulty of solving integer factorization and discrete logarithm problems. All these problems can be solved efficiently using a powerful quantum computer running Shor's algorithm. In the future when PQC becomes the norm, other technologies like RSA and Diffie-Hellman will become obsolete, so PQC can be used instead.

The secret will be packaged in either a Cryptographic Message Syntax ("CMS") and JSON Web Token ("JWT").

The CMS Signed Data message consists of cleartext (unencrypted) content, one or more digital signatures computed over the content, and sets of certificates used in signature verification.

| Signed Data ::= SEQENCE | | Characteristics |
|---|---|---|
| 1 | Version | Mandatory |
| 2 | Digest Algorithms | Mandatory (1 or more) |
| 3 | Encrypted Content Info | Mandatory |
| 4 | Certificates | Optional |
| 5 | Signer Information | Mandatory (1 or more) |

Digest Algorithms is the list of algorithm identifiers, including digital signature algorithms and hash algorithms used with the digital signatures. Note that a message digest is distinguished. Certificates are the list of relevant certificates used to verify the digital signatures. Note that the certificates can be included within the Signed Data message or previously distributed using other methods.

Signer Information is another structure within the Signed Data message, and there is a separate Signer Information for each signer.

| Signer Information ::= SEQENCE | | Characteristics |
|---|---|---|
| 1 | Version | Mandatory |
| 2 | Signer Identifier | Mandatory |
| 3 | Digest Algorithm | Mandatory |
| 4 | Signed Attributes | Optional |
| 5 | Signature Algorithm | Mandatory |
| 6 | Signature | Mandatory |
| 7 | Unsigned Attributes | Optional |

Signed Data provides a digital signature over cleartext content for data integrity and signer authentication; however, since the content is clear text and not encrypted, it cannot provide data confidentiality.

The CMS Enveloped Data message, a common method to all CMS standards, consists of five fields: three are mandatory (version, recipient info, encrypted content), and two (originator info, unprotected attributes) are optional. The content is encrypted using a unique Content Encryption Key (CEK) per message.

| Enveloped Data ::= SEQENCE | | Characteristics |
|---|---|---|
| 1 | Version | Mandatory |
| 2 | Originator Info | Optional |
| 3 | Recipient Info | Mandatory (1 or more) |
| 4 | Encrypted Content Info | Mandatory |
| 5 | Unprotected Attributes | Optional |

The message is sent to one or more recipients. Each recipient gets the same encrypted content using the same CEK, but the message contains separate key management information per recipient.

| 3 | Recipient Info | Description |
|---|---|---|
| ktri | KeyTransRecipientInfo | Key Transport Recipient Information |
| kari | KeyAgreeRecipientInfo | Key Agreement Recipient Information |
| kari | KEKRecipientInfo | Key Encryption Key (KEK) Recipient Information |
| pwri | PasswordRecipientInfo | Password Recipient Information |
| ori | OtherRecipientInfo | Other Recipient Information |

Content-encryption key (CEK) is encrypted with the recipient's RSA public key. Key Agreement is the recipient's DH or ECDH public key, and the sender's DH or ECDH private key is used to generate a pairwise symmetric key. Then the CEK is encrypted using the pairwise symmetric key. Pre-Established Key Encryption Key is the content-encryption key ("CEK") is encrypted in a previously distributed symmetric key-encryption key ("KEK"). The KEK might be pre-established using any variety of key management methods.

Password-Based Encryption ("PBE") is a previously established password that is used with a key derivation function ("KDF") to generate a KEK, and then the CEK is encrypted using the derived KEK. PBE is described in PKCS #12 but called password-based privacy mode, whereas two KDF algorithms ("PBDKF1" and "PBKDR2") are defined in PKCS #5 for PBE used with PKCS #12 objects. Other key management techniques include Constructive Key Management ("CKM") and Database Encryption Key Management ("DBEKM")

The CMS Encrypted Data message, another common method to all CMS standards, consists of only three fields: two are mandatory (version, encrypted content), and one (unprotected attributes) are optional. This message type contains no formal key management information, though optional, unprotected attributes may be included for any purpose.

| Encrypted Data ::= SEQENCE | | Characteristics |
|---|---|---|
| 1 | Version | Mandatory |
| 2 | Encrypted Content Info | Mandatory |
| 3 | Unprotected Attributes | Optional |

Because no key management information or recipient information is included, this message is typically not used for transporting encrypted data. However, since there is often confusion between Enveloped Data versus Encrypted Date, this message type is included for clarification.

The CMS Signcrypted Data message, based on ISO/IEC 29150 standard, combines a digital signature with public-key encryption into a single efficient operation, using the public/private keys of the sender and the public key of each recipient. Note that PKCS #7 originally contained signedand-enveloped-data, which the IEFT eliminated in RFC 2630, but it was a two-step process, first sign and then encrypt.

JavaScript Object Notation ("JSON") uses data strings, a sequence of zero or more Unicode characters, which are represented in one of three encoding forms: 32-bit form (UTF-32), 16-bit form (UTF-16), and 8-bit form (UTF-8) reuses existing ASCII-based systems.

JSON-based data structures encode all data strings using Base64URL, which is slightly different than Base64 (the plus "+" and underline "_" characters are replaced with the minus "−" and virgule "/" characters).

JSON-based data structures consist of one or more Headers and JSON Web-specific objects. JWS provides rules for cryptographic signatures (digital signatures or HMAC). JWE provides rules for content encryption. JWK provides rules for symmetric and asymmetric cryptographic keys. JWA provides rules for cryptographic algorithms. JWT provides rules for Web Tokens. When public keys or public-key certificates are URI-based resources, these must be encoded as a JWK Set and transmitted over a TLS connection. Further note that Quantum TLS using post-quantum cryptography is not yet available.

JSON Web Signature ("JWS") represents content secured with digital signatures or key-hashed message authentication codes (HMAC) using JSON-based data structures. The JWS Cryptographic Algorithms for Digital Signatures and MAC are defined in the JSON Web Algorithms (JWA) listed below. JWS supports two data structures: (a) JWS JSON Serialization and (b) JWS Compact Serialization. The JWS JSON Serialization data structures are more verbose, consisting of the JSON Object Signing and Encryption (JOSE) Header (two headers) and two JWS objects as follows: JOSE Header (consisting of two JWE headers), JWS Protected Header, JWS Unprotected Header, JWS Payload, and JWS Signature. The JWs Compact Serialization data structure has fewer (three) components: JWS Protected Header, JWS Payload, JWS Signature. JWS uses the term digital signature and MAC, but the latter refers to keyed-hash message authentication code (HMAC).

JSON Web Encryption ("JWE") represents encrypted content using JSON-based data structures. JWE uses a Content Encryption Key (CEK) to encrypt the plaintext to produce the JWE Ciphertext and the JWE Authentication Tag. Note, this is similar to the X9.73 CMS approach. The JWE Cryptographic Algorithms for Key Management are defined in the JSON Web Algorithms (JWA). JWE supports two data structures: (a) JWE JSON Serialization and (b) JWE Compact Serialization.

The JWE JSON Serialization data structures are more verbose, consisting of the JSON Object Signing and Encryption (JOSE) Header (three headers) and five JWE objects as follows: JOSE Header (consisting of three JWE headers), JWE Protected Header, JWE Shared Unprotected Header, JWE Per-Recipient Unprotected Header), JWE Encrypted Key, JWE Initialization Vector, JWE AAD, JWE Ciphertext, and JWE Authentication Tag.

The JWE Compact Serialization data structure has fewer (five) components: JWE Protected Header, JWE Encrypted Key, JWE Initialization Vector, JWE Ciphertext, and JWE Authentication Tag.

JWE uses the term Key Management Mode as the method of determining the Content Encryption Key (CEK) value to use, where each algorithm used for determining the CEK value uses a specific Key Management Mode defined as follows.

Key Encryption is the mode in which the CEK value is encrypted to the intended recipient using an asymmetric encryption algorithm. Note this is Key Transport (ktri) in X9.73 CMS. Key Wrapping is the mode in which the CEK value is encrypted to the intended recipient using a symmetric key wrapping algorithm. Note this is KEK (kari) in X9.73 CMS. Direct Key Agreement is the mode in which a key agreement algorithm is used to agree upon the CEK value. Note, CMS does not support this mode. Key Agreement with Key Wrapping is the mode in which a key agreement algorithm is used to agree upon a symmetric key used to encrypt the CEK value to the intended recipient using a symmetric key wrapping algorithm. Note, this is Key Agreement (kari) in X9.73 CMS. Direct Encryption is how the CEK value used is the secret symmetric key value shared between the parties. Note this is Named Key in X9.73 CMS.

JSON Web Key ("JWK") is a JSON data structure that represents a cryptographic key. This specification also defines a JWK Set JSON data structure that represents a set of JWKs. Unlike JWS or JWE, the JWK format is a string of nine parameters as follows: Key Type ("kty") Parameter must be present in a JWK, Public Key Use ("use") Parameter is optional, Key Operations ("key_ops") Parameter is optional, Algorithm ("alg") Parameter is optional, Key ID ("kid") Parameter is optional, X.509 URL ("x5u") Parameter is an optional URI that refers to a resource for an X.509 public key certificate or certificate chain, X.509 Certificate Chain ("x5c") Parameter is an optional certificate chain, X.509 Certificate SHA-1 Thumbprint ("x5t") Parameter is optional, X.509 Certificate SHA-256 Thumbprint ("x5t #s256") Parameter is optional.

Note that the IETF X.509 version is a profile of the ITU-T X.509:2015 standard and does not include all extensions and does not address newer X.509:2019 extensions such as alternate subject public key and alternate certificate signature. Further, note that certificate thumbprints (hash of the whole certificate) are not part of the actual X.509 certificate; rather, they are metadata about certificates used by systems and protocols (e.g., JWK).

The JWK SET format begins with the Keys ("keys") Parameter and includes one or more JWK objects.

JSON Web Algorithms ("JWA") registers cryptographic algorithms and identifiers to be used with the JSON Web Signature (JWS), JSON Web Encryption (JWE), and JSON Web Key (JWK) specifications and defines several IANA registries for these identifiers. JWA uses its own unique names.

JWS Cryptographic Algorithms for Digital Signatures and MACs uses cryptographic algorithms to digitally sign or create a MAC of the JWS Protected Header and the JWS Payload contents.

| "alg" | Description | Implementation |
|---|---|---|
| HS256 | HMAC using SHA-256 | Required |
| HS384 | HMAC using SHA-384 | Optional |
| HS512 | HMAC using SHA-512 | Optional |
| RS256 | RSASSA-PKCS1-v1_5 using SHA-256 | Recommended |
| RS384 | RSASSA-PKCS1-v1_5 using SHA-384 | Optional |
| RS512 | RSASSA-PKCS1-v1_5 using SHA-512 | Optional |
| ES256 | ECDSA using P-256 and SHA-256 | Recommended |
| ES384 | ECDSA using P-384 and SHA-384 | Optional |
| ES512 | ECDSA using P-521 and SHA-512 | Optional |
| PS256 | RSASSA-PSS using SHA-256 and MGF1 with SHA-256 | Optional |
| PS384 | RSASSA-PSS using SHA-384 and MGF1 with SHA-384 | Optional |

-continued

| "alg" | Description | Implementation |
|---|---|---|
| PS512 | RSASSA-PSS using SHA-512 and MGF1 with SHA-512 | Optional |
| none | No digital signature or MAC performed | Optional |

JWE Cryptographic Algorithms for Key Management uses cryptographic algorithms to encrypt or determine the Content Encryption Key (CEK).

| "alg" | Description | Implementation |
|---|---|---|
| A128CBC-HS256 | AES_128_CBC_HMAC_SHA_256 authenticated encryption | Required |
| A192CBC-HS384 | AES_192_CBC_HMAC_SHA_384 authenticated encryption | Optional |
| A256CBC-HS512 | AES_256_CBC_HMAC_SHA_512 authenticated encryption | Required |
| A128GCM | AES GCM using 128-bit key | Recommended |
| A192GCM | AES GCM using 192-bit key | Optional |
| A256GCM | AES GCM using 256-bit key | Recommended |

JSON Web Token (JWT) represents a set of claims as a JSON object encoded in a JWS and/or JWE structure. The contents of the JOSE Header describe the cryptographic operations applied to the JWT Claims Set. If the JOSE Header is for a JWS, the JWT is represented as a JWS, and the claims are digitally signed or MACed, with the JWT Claims Set being the JWS Payload. If the JOSE Header is for a JWE, the JWT is represented as a JWE, and the claims are encrypted, with the JWT Claims Set being the plaintext encrypted by the JWE. A JWT may be enclosed in another JWE or JWS structure to create a Nested JWT, enabling nested signing and encryption to be performed. The JWE (JWS (JWT Claim Set)) means the cleartext claims are signed and then encrypted. The JWS (JWE (JWT Claim Set)) represents the claims are encrypted, and the ciphertext is signed. Support for Nested JWTs is optional.

JWT support for JWS of the signature and MAC algorithms specified in JSON Web Algorithms [JWA], only HMAC SHA-256 ("HS256") and "none" must be implemented by conforming JWT implementations. It is recommended that implementations also support RSASSA-PKCS1-v1_5 with the SHA-256 hash algorithm ("RS256") and ECDSA using the P-256 curve and the SHA-256 hash algorithm ("ES256").

| "alg" | Description | Implementation |
|---|---|---|
| HS256 | HMAC using SHA-256 | Required |
| RS256 | RSASSA-PKCS1-v1_5 using SHA-256 | Recommended |
| ES256 | ECDSA using P-256 and SHA-256 | Recommended |
| none | No digital signature or MAC performed | Required |

Support for other algorithms and key sizes is optional.

JTW support for JWE Key Management for encrypted JWTs is optional.

| "alg" | Description | Implementation |
|---|---|---|
| RSA1_5 | RSAES-PKCS1-v1_5 | Required |
| A128KW | AES Key Wrap with default initial value using 128-bit key | Required |
| A256KW | AES Key Wrap with default initial value using 256-bit key | Required |

-continued

| "alg" | Description | Implementation |
|---|---|---|
| ECDH-ES | ECDH Ephemeral Static key agreement using Concat KDF | Recommended |
| ECDH-ES + A128KW | ECDH-ES using Concat KDF and CEK wrapped A128KW | Recommended |
| ECDH-ES + A256KW | ECDH-ES using Concat KDF and CEK wrapped A256KW | Recommended |

If an implementation provides encryption capabilities of the encryption algorithms specified in [JWA], only RSAES-PKCS1-v1_5 with 2048-bit keys ("RSA1_5"), AES Key Wrap with 128- and 256-bit keys ("A128KW" and "A256KW") MUST be implemented by conforming implementations. It is recommended that implementations also support using Elliptic Curve Diffie-Hellman Ephemeral Static (ECDH-ES) to agree upon a key used to wrap the Content Encryption Key ("ECDH-ES+A128KW" and "ECDH-ES+A256KW"). Support for other algorithms and key sizes is optional.

JWT support for JWE Content Encryption is optional.

| "alg" | Description | Implementation |
|---|---|---|
| A128CBC-HS256 | AES_128_CBC_HMAC_SHA_256 authenticated encryption | Required |
| A256CBC-HS512 | AES_256_CBC_HMAC_SHA_512 authenticated encryption | Required |
| A128GCM | AES GCM using 128-bit key | Recommended |
| A256GCM | AES GCM using 256-bit key | Recommended |

The composite authenticated encryption algorithm using AES-CBC and HMAC SHA-2 ("A128CBC-HS256" and "A256CBC-HS512") must be implemented by conforming implementations. It is recommended that implementations also support using AES in Galois/Counter Mode (GCM) with 128- and 256-bit keys ("A128GCM" and "A256GCM"). Support for other algorithms and key sizes is optional.

The present disclosure uses CMS-based Enveloped Data to protect confidential customer information in transient for various scenarios, including transfer from the customer to the digital asset vault module 204, transfer from the digital asset vault module 204 directly to a secure vault application, transfer from the digital asset vault module 204 back to the customer for use with another secure vault application, transfer from the digital asset vault module 204 back to the customer for use with a third-party secure vault application, transfer from the digital asset vault module 204 directly to a customer designated third-party secure vault application, and transfer from the digital asset vault module 204 directly to a customer designated recipient.

A CMS-Based Implementation, for each of these scenarios, the CMS-based Enveloped Data can be used to protect customer confidential information is transient. The customer's confidential information is encrypted with a content encryption key (CEK). The CEK is encrypted using any of the CMS Enveloped Data key management methods, including key transport (ktri) or key agreement (kari).

Legacy cryptographic algorithms use RSA for key transport and either DH or ECDH for key agreement. The NIST Post Quantum Cryptography (PQC) program is developing the next generation of algorithms to run on classic computers that are resistant to cryptanalysis run on quantum computers. These PQC algorithms will replace existing digital signature algorithms (e.g. RSA, DSA, ECDSA) and key establishment algorithms (e.g. RSA, DH, ECDH). The present disclosure is likewise supported PQC algorithms within the CMS constructs.

When incorporating digital signatures, either Signed Data would be encapsulated as the encrypted content within Enveloped Data, or Signcrypted Data would be used.

Message=Enveloped Data (Signed Data (customer confidential data))

Message=Signcrypted Data (customer confidential data)

When not using digital signature, such as for scenario (a) where the customer might not have the digital signature capability, only the Enveloped Data would be used.

Message=Enveloped Data (customer confidential data)

Keeping asymmetric private keys and symmetric keys operationally safe inside FIPS 140-2 (or FIPS 140-3) security level 3 (or security level 4) is material to the present disclosure.

A JWT-Based Implementation, for each of these scenarios, the JWT support for JWE can protect customer confidential information is transient. When incorporating digital signatures, Nested JWT might be used. When not using digital signature, such as for scenario (a) where the customer might not have the digital signature capability, only the JWT support for JWE would be used.

Once the secret (e.g., mnemonic, secret, etc.) associated with the digital asset is transported securely, the storage module 304 achieves a high level of security for storage of the secret. For example, database encryption software can be used to achieve the desired high levels of security in the present disclosure. To bolster security, the storage module 304 enables double encryption. In this example, the first level of encryption occurs using Vormetric, and the second level by enabling HSM the sole power to decrypt.

The storage process may store values in the database in an encrypted blob with the only method to decrypt using the HSM. The HSM holds onto the key to encrypt and decrypt individual values in the database.

The storage module 304 may use a number of different storage types, such as HSM (for storage and encryption), Multi-Party-Computing ("MPC"), enclaves, and content management systems. The storage considerations for the storage module 304 are discussed in detail in FIG. 7.

Figure 4:
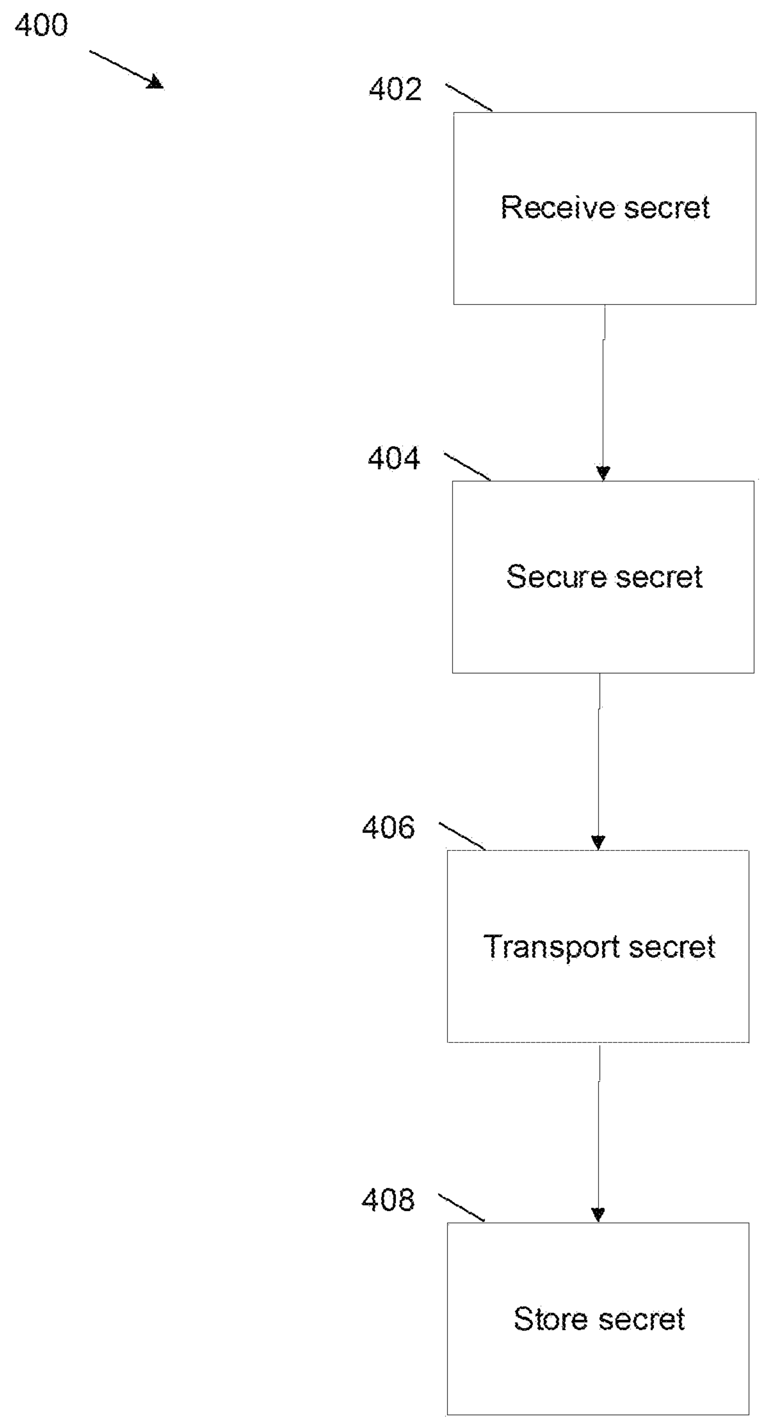
FIG. 4 shows an example method for securing a secret in the digital asset vault of FIG. 2.

FIG. 4 shows an example method 400 for securing a secret in the digital asset vault of FIG. 2.

At step 402, the secret to be secured in the digital asset vault is received. This can be accomplished various ways, such as through the graphical user interfaces described here. See FIG. 5.

Next, at operation 404, one or more cryptography techniques (e.g., RSA, ECDH (Diffie Hellman), or PQC) is used to securely encrypt the secret. Examples of these techniques are described herein.

Next, at operation 406, the encrypted secret is transported to the digital asset vault for storage. Various transport techniques to accomplish this are described herein.

Finally, at operation 408, additional cryptography techniques (e.g., RSA, ECDH (Diffie Hellman), or PQC) are used to decrypt the secret and encrypt the secret again for storage in the digital asset vault. See FIG. 7.

Figure 5:
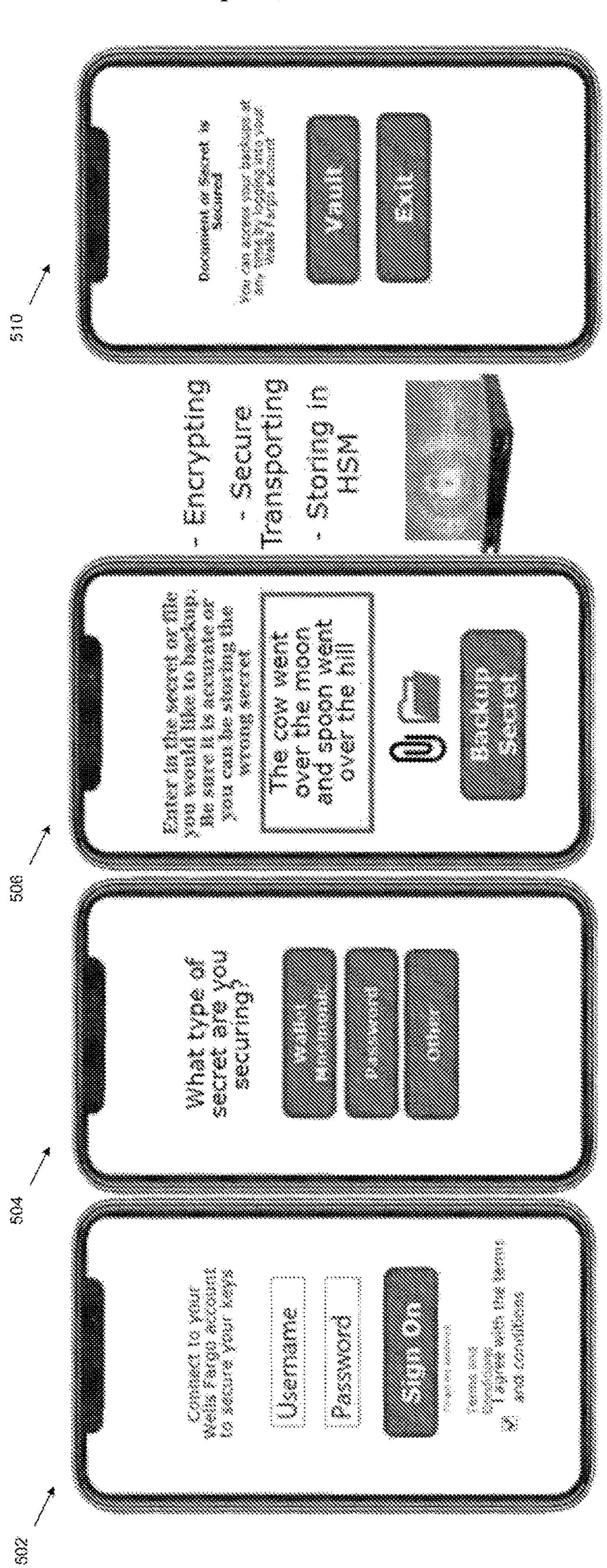
FIG. 5 shows a series of example graphical user interfaces of the server device of FIG. 2.

FIG. 5 schematically shows a series of interfaces 500 generated by the graphical user interface module 202 of the present disclosure. The interfaces 500 are rendered via the server device 112 on one or more of the client devices 102, 104, 106.

The interface 502 enables the user to use a secure channel to connect to the digital asset vault module 204. In one non-limiting example, the customer login into their secure accounts using a company portal where the customer will directly access the digital asset vault module 204 via an institution's web or mobile application.

For example, in one form of authentication, the customer's OAuth token is received. Using the OAuth token, the service knows who the customer is and if proper permissions are in place to apply these services to the customer. Every exchange in this process can include the OAuth token to provide context on which customer is being engaged.

Upon authentication, the interface 504 allows the user to categorize the secret desired to be secured. In one non-limiting example, the type of secret categorization can be a wallet mnemonic, password, or other secret. In some examples, the secret is defined using the interfaces 500, or the interfaces 500 are used to securely transport the assets to the digital asset vault module 204.

The interface 506 allows the user to enter the secret. If the secret is text, then the user is able to type it into a text box. If the secret is in a digital document, then the digital document can be uploaded.

Once the secret is inputted, the user is able to select a control ("Backup Secret") to initiate the transfer of the secret to the digital asset vault module 204. The transfer can include the encrypting, secure transporting, and storing in HSM of the secret. In one non-limiting example, RSA-OAEP encryption and database storage would be utilized.

The interface 510 is displayed once the secret is successfully transported and stored in the digital asset vault module 204. The user is able to verify that the secret is in the vault by selecting a button to view the asset ("Vault") or may exit by selecting the "Exit" control.

In one example, the digital asset vault module 204 may be accessed through a secure vault application portal. The portal is typically accessed with a web browser compatible with the secure vault application and can be used to store and manage secrets. The portal and secure vault application can be accessed by the same institution's financial management. The portal is typically managed by some financial institution that works a secure finance application. An advantage of this is that a user can have multiple access points and decide whether to use a smart device or web portal to access the secure vault application. On the portal page, a user view storage activity, such as the date last accessed, date of initial storage, etc., and performs basic actions such as transferring, exporting, and editing owners.

Figure 6:
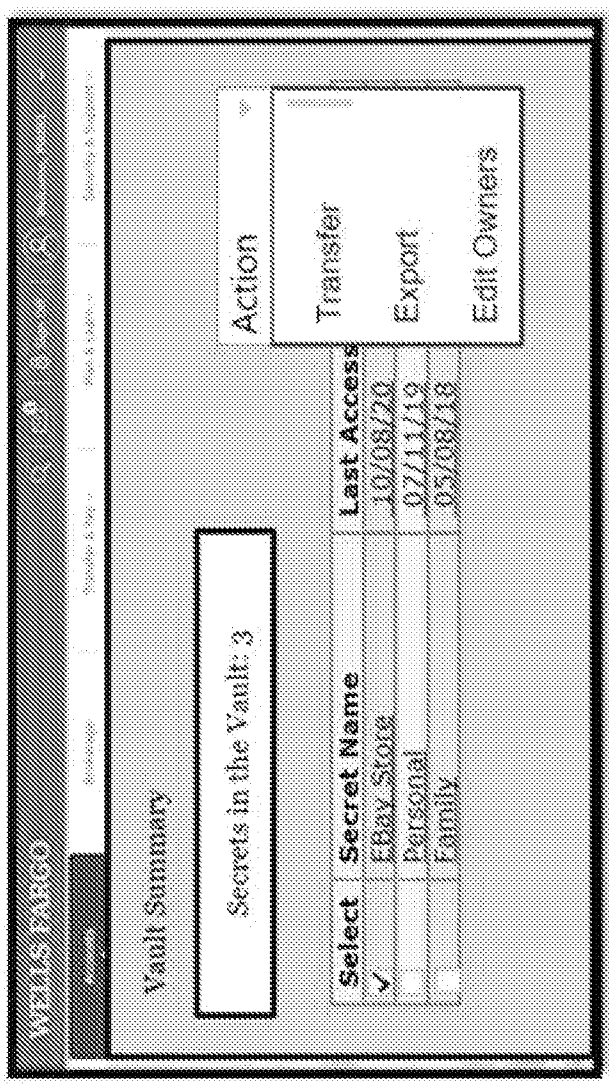
FIG. 6 shows an example interface of the digital asset vault of the server device of FIG. 2.

FIG. 6 schematically shows aspects of an example interface 600 for the digital asset vault module 204 of the server device 112. The digital asset vault module 204 can contain several secrets that are stored, alias names, and activity history, etc. Customers are enabled to, for example, transfer secrets to another third-party vault, export the secrets to their desktop, and edit the ownership within the vault. Within the interface 600, the customer can perform a number of actions, such as transferring, exporting, and editing owners. Transferring is useful when multiple vaults exist in the marketplace.

For example, a customer would like to securely move their secret to another digital vault with the transferring action. In another example, a customer using a third-party service where the secret is located within the third-party service wants to move their secret to the digital asset vault module 204. Exporting occurs when a customer would like to download the encrypted secret. Through the editing action, the customer is able to edit ownership. The customer may add or remove owners to their digital assets, which is particularly useful in cases where customers want to ensure that their trusted persons can access the digital assets if something were to happen to the customer, such as the customer being incapacitated or deceased.

Figure 7:
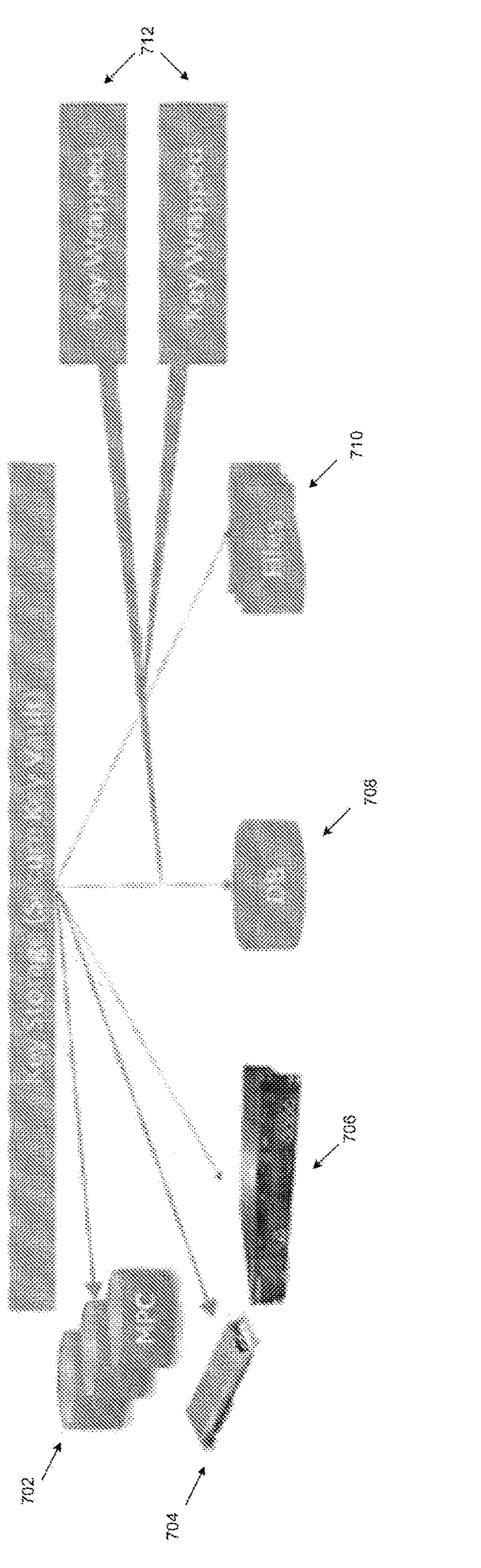
FIG. 7 shows an example digital asset vault module of the server device of FIG. 2.

FIG. 7 shows a schematic representation of the digital asset vault module 204 in accordance with the present disclosure. As briefly discussed in FIG. 3, multiple storage options can be considered as seen in diagram 700, such as MPC 702, enclaves 704, database 708, files 710, and an HSM device 706.

In Multi-Party Computing 702 (MPC), multiple parties do not wish to share their information but would still like to work together to solve a problem. A benefit with MPC 702 is that there is no single point of failure because the secret does not live in one place. However, because MPC 702 is not compliant with the ISA 19592 security standards, it is not considered the best storage option in the present disclosure.

While enclaves 704 are very similar to HSM 706, enclaves are typically smaller and more lightweight. Further, some HSM 706 have enclaves 704 within them. A popular enclave in the blockchain community is Intel SGX, where a user can write code inside the enclave and ensure no outside party can read any of its contents, except if it's in its encrypted form. Enclaves 704 are currently not NIST certified; as a result, it is not confidently attested to its security.

HSM 706 are tamper-proof, certified by the National Institute of Standards and Technology ("NIST"), and have obtained a level 3 FIPS 140, resulting in high safety assurance and the highest level of security. However, one issue regarding storage with HSM 706 is that FutureX HSM does not store text values. While there is a possibility of converting the secret into a key, it would likely result in unnecessary additional work. In contrast, ultimately, when the customer requests the key back, the customer would likely rather see the secret phrase over a key. As a result, HSM 706 is used only to encrypt and decrypt the secret, not for storage. The only thing that persist in the HSM 706 are the encryption and signing key pairs.

In the example provided, a database 708 is used in the present disclosure as secure storage. As will be discussed in more detail below, JWE data consisting of encrypted text and key wrapped 712 the content-encryption key for the recipient, along with additional meta-data.

With content management of files 710, every secret is stored separately as a file. While files may be the simplest to stand up, files can be challenging to manage. In one example, Google uses files when Coinbase users store their keys, and the keys are secured as a separate file in the user's Google Drive account.

The next step in backing up and retrieving data from the digital asset vault module 204 involves encryption. Using the encryption key established at the key generation module 302, the client uses the generated public key to encrypt the secret when sending the secret over to the digital asset vault module 204. The process is reversed during retrieval, where the HSM uses the generated public key to encrypt the secret text value.

After encryption, the secret is prepared and stored in or retrieved from the database 708. The JWE is sent to the HSM and decrypted using its HSM Service Public Key. The key is then re-encrypted under a Data Encryption Key (DEK). The HSM performs in two separate Encrypt JSON commands (JOSD and GPED). After the secret is re-encrypted, it is sent as an encrypted blob to the database for storage, along with metadata (i.e., ECN ID or public key used to encrypt). Typically, messages are transported in a JWE (JSON Web Encrypted) data structure. JWE data consists of the encrypted text and wrapped content-encryption keys for the recipient, along with additional meta-data.

An ideal approach to verify the integrity of the secret sent over is to have the customer physically verify it. A hint may be attached to the secret, and once everything is decrypted, the hint can be extracted and prompt the customer to verify if the hint is correct. If the data were tampered with, then the proper hint would not be presented.

Figure 8:
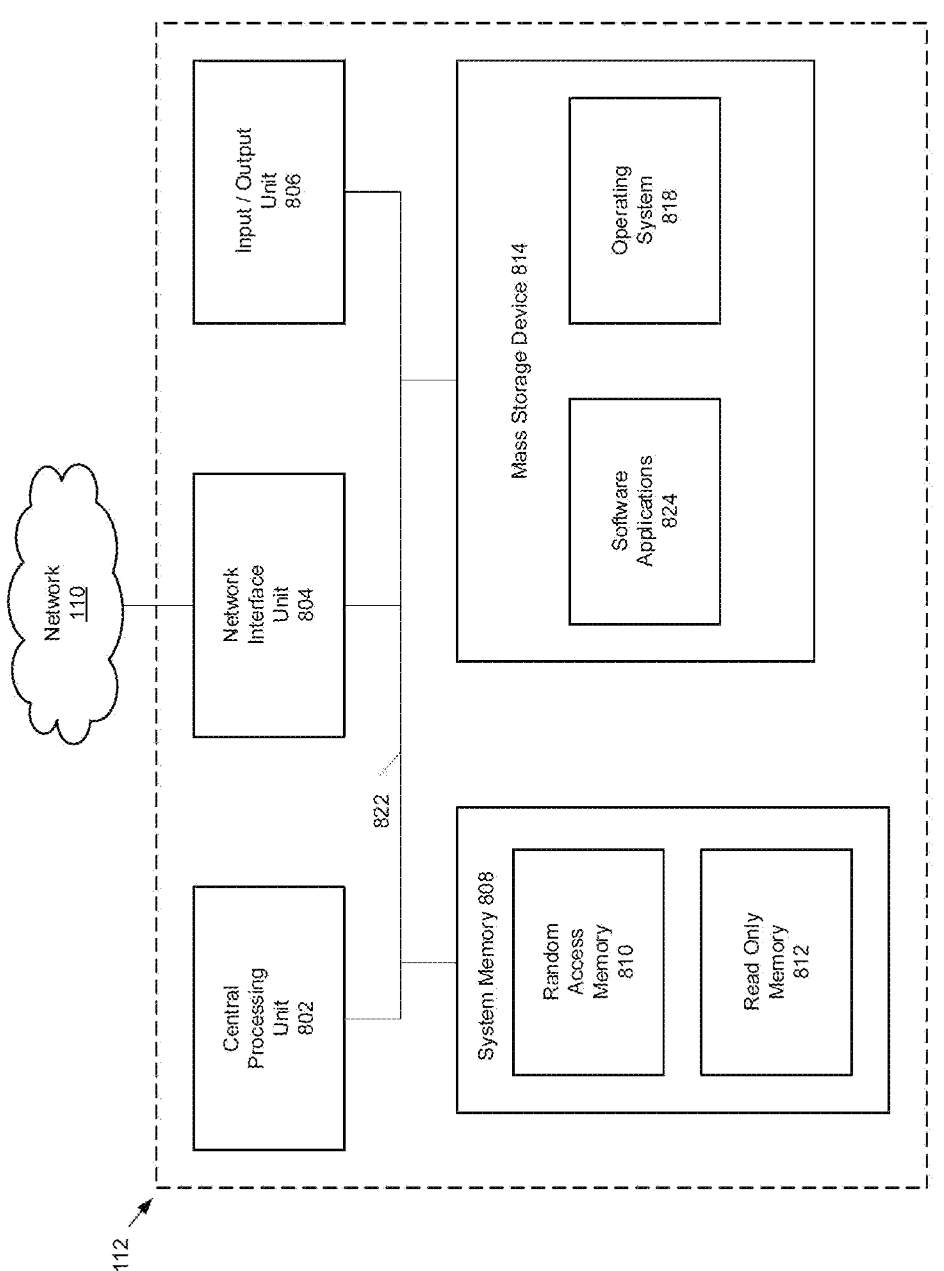
FIG. 8 shows example physical components of the server device of FIG. 2.

As illustrated in the example of FIG. 8, server device 112 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the server device 112, such as during startup, is stored in the ROM 812. The server device 112 further includes a mass storage device 814. The mass storage device 814 can store software instructions and data. A central processing unit, system memory, and mass storage device similar to that in FIG. 8 are also included in other computing devices disclosed herein (e.g., devices 102, 104, and 106).

The mass storage device 814 is connected to the CPU 802 through a mass storage controller (not shown) connected to the system bus 822. The mass storage device 814 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 804 connected to the system bus 822. It should be appreciated that the network interface unit 804 may also be utilized to connect to other types of networks and remote computing systems. The server device 112 also includes an input/output controller 806 for receiving and processing input from a number of other devices, including a touch user interface display screen or another type of input device. Similarly, the input/output controller 806 may provide output to a touch user interface display screen or other output devices.

As mentioned briefly above, the mass storage device 814 and the RAM 810 of the server device 112 can store software instructions and data. The software instructions include an operating system 818 suitable for controlling the operation of the server device 112. The mass storage device 814 and/or the RAM 810 also store software instructions and applications 824, that when executed by the CPU 802, cause the server device 112 to provide the functionality of the server device 112 discussed in this document. For example, the mass storage device 814 and/or the RAM 810 can store the digital asset vault module 204, the key generation module 302, the graphical user interfaces 202, and the storage module 304 (FIG. 2 and FIG. 3).

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for a digital asset vault, comprising:

one or more processors; and non-transitory computer-readable storage encoding instructions which, when executed by the one or more processors, cause the system to:

receive a secret from a first wallet;

encrypt the secret at least twice based on at least a first encryption technique provided by the first wallet and a second encryption technique different from the first encryption technique and provided by a second wallet, to provide an encrypted secret;

transport the encrypted secret to the digital asset vault; and store the secret in the digital asset vault, including to decrypt and re-encrypt the encrypted secret.

2. The system of claim 1, wherein the non-transitory computer-readable storage encodes further instructions which, when executed by the one or more processors, cause the system to generate an interface, the interface including selectable options for a type of the secret.

3. The system of claim 1, wherein the non-transitory computer-readable storage encodes further instructions which, when executed by the one or more processors, cause the system to generate an interface once the secret is stored in the digital asset vault, the interface including a selectable option for accessing the digital asset vault.

4. The system of claim 1, wherein the non-transitory computer-readable storage encodes further instructions which, when executed by the one or more processors, cause the system to generate an interface, the interface including a text box for entering the secret.

5. The system of claim 1, wherein the encrypted secret is stored in the digital asset vault using hardware secure modules.

6. The system of claim 1, wherein the first wallet is a cryptocurrency wallet.

7. The system of claim 1, wherein the secret is a cryptocurrency wallet mnemonic phrase.

8. The system of claim 1, wherein the secret is a password.

9. The system of claim 1, wherein the digital asset vault comprises a backup service.

10. The system of claim 1, wherein the secret is decrypted using one or more of an Elliptic Curve Diffie Hellman Ephemeral scheme, a RSA-Optimal Asymmetric Encryption Padding scheme, and a Post-Quantum Cryptography scheme.

11. A computer-implemented method of securely transporting and storing data, comprising:

receiving a secret from a first wallet;

encrypting the secret at least twice based on at least a first encryption technique provided by the first wallet and a second encryption technique different from the first encryption technique and provided by a second wallet, to provide an encrypted secret;

transporting the encrypted secret to a digital asset vault; and storing the secret in the digital asset vault, including decrypting and re-encrypting the encrypted secret.

12. The method of claim 11, comprising generating an interface, the interface including selectable options for a type of the secret.

13. The method of claim 11, comprising generating an interface once the secret is stored in the digital asset vault, the interface including a selectable option for accessing the digital asset vault.

14. The method of claim 11, comprising generating an interface, the interface including a text box for entering the secret.

15. The method of claim 11, wherein the encrypted secret is stored in the digital asset vault using hardware secure modules.

16. The method of claim 11, wherein the first wallet is a cryptocurrency wallet.

17. The method of claim 11, wherein the secret is a cryptocurrency wallet mnemonic phrase.

18. The method of claim 11, wherein the secret is a password.

19. The method of claim 11, wherein the digital asset vault comprises a backup service.

20. The method of claim 11, wherein the decrypting includes using one or more of an Elliptic Curve Diffie Hellman Ephemeral scheme, a RSA-Optimal Asymmetric Encryption Padding scheme, and a Post-Quantum Cryptography scheme.

* * * * *